UNITED STATES PATENT OFFICE.

EDWARD CLARK, OF BROOKLYN, NEW YORK.

IMPROVEMENT IN MAKING PRINTER'S INK.

Specification forming part of Letters Patent No. 4,102, dated July 5, 1845.

*To all whom it may concern:*

Be it known that I, EDWARD CLARK, of the city of Brooklyn, county of Kings, and State of New York, have discovered and invented a new and useful Improvement in the Manufacture or Composition of Printer's Ink, which is applicable to printing with plates and types the different varieties of black and dark colors upon paper; and I do hereby declare that the following is a full and exact description thereof.

My discovery consists in dissolving asphaltum, or pitch, or turpentine, or balsam, or rosin, or any other resinous, gummy, or concrete bituminous substance or substances, singly, or compounded, or mixed one or more of them together in the liquid which is condensed from the distillation of anthracite and colophony simultaneously in iron retorts for the manufacture of carbureted-hydrogen gas for illuminating purposes or otherwise. The product so condensed and obtained I denominate, for the convenience of description, "colophene."

To enable others skilled in the art of making printer's ink to use my invention, I describe it as follows:

The colophene best adapted for the manufacture of printer's ink is that obtained from a second distillation of the article with anthracite, because by this process it is rendered more dark and viscid; but it is not, nor can it well be, prepared of uniform consistency; but this is to be remedied by adding a greater or less quantity of asphaltum or rosin, or of whatever article the manufacturer may desire to use, to the colophene till it has acquired the necessary viscidity or consistence to receive the requisite quantity of lamp-black or other material to form printer's ink. The colophene is to be heated in an iron kettle to a temperature of 220° or 230° Fahrenheit, to drive off any water that may be present in it, after which about two pounds of asphaltum or rosin, or of any other material intended to be used, is to be added to every gallon of the colophene, and the whole kept in motion till the substance so added be dissolved and a uniform fluid formed. If on cooling the mixture be too thick, more colophene is to be added, and vice versa.

If the ropy quality of the ink requires to be increased, I dissolve half an ounce of caoutchouc in every gallon of the mixture, or such quantity as will impart the proper consistency to it. I also add yellow rosin, soap, or soft soap to the ink in such quantity as it will bear for the same purpose that it is used in the ordinary manufacture of printer's ink—viz., to allow the types, whenever they clog, to be more easily cleaned. The use of a large quantity of this article causes the types to form rough lines, which is to be avoided. It should be here remarked that when it is desirable to preserve this kind of printer's ink for a length of time, or when too stiff to increase its fluidity, a small quantity of prepared linseed-oil, in which litharge or some other drying material has been dissolved, is to be added.

In preparing ink for copperplate-printing I use Frankfort black instead of lamp-black. Most of the materials used in the preparation of this ink are, when heated, inflammable, and means should be provided in the preparation of the colophene to guard against accidents from fire.

What I claim as my discovery, and the advantages of which I wish to secure to myself and my legal representatives by obtaining Letters Patent, is—

The admixture or combination of colophene either with asphaltum, or rosin, or pitch, or tupentine, or balsam, or prepared linseed-oil, or caoutchouc, or with any of the materials known as resins, gum-resins, and bitumens, or with any two or more of them, and with lamp-black or Frankfort black or other dark-colored matter, in such due proportions as to form printer's ink, and the proportions before given, varied by the judgment of the manufacturer according to the consistency of the mixed materials used, will be found to effect the object.

EDWARD CLARK.

In presence of—
JOSEPH STURNZ,
JAMES P. HYATT.